United States Patent
Gupta et al.

(10) Patent No.: US 12,271,571 B2
(45) Date of Patent: Apr. 8, 2025

(54) PERSONALIZED GRAPHICAL USER INTERFACE DISPLAYS

(71) Applicant: The Western Union Company, Denver, CO (US)

(72) Inventors: Mayank Gupta, Sunnyvale, CA (US); Shankar Narayan, Pleasanton, CA (US)

(73) Assignee: The Western Union Company, Denver, CO (US)

( * ) Notice: Subject to any disclaimer, the term of this patent is extended or adjusted under 35 U.S.C. 154(b) by 19 days.

(21) Appl. No.: 16/774,806

(22) Filed: Jan. 28, 2020

(65) Prior Publication Data
US 2021/0232273 A1 Jul. 29, 2021

(51) Int. Cl.
*G06F 3/0481* (2022.01)
*G06F 3/0482* (2013.01)
*G06F 9/451* (2018.01)
*G06N 20/00* (2019.01)

(52) U.S. Cl.
CPC ............ *G06F 3/0482* (2013.01); *G06F 9/451* (2018.02); *G06N 20/00* (2019.01)

(58) Field of Classification Search
CPC ........ G06F 3/0482; G06F 9/451; G06N 20/00
See application file for complete search history.

(56) References Cited

U.S. PATENT DOCUMENTS

| | | | | |
|---|---|---|---|---|
| 2009/0249359 A1* | 10/2009 | Caunter | ............... | G06F 9/44505 719/315 |
| 2012/0089930 A1* | 4/2012 | Stanton, IV | ........... | C12M 29/20 715/763 |
| 2014/0309872 A1* | 10/2014 | Ricci | ..................... | A61B 5/7405 701/36 |
| 2016/0092036 A1* | 3/2016 | Rodgers | ................ | G06F 40/103 715/762 |
| 2017/0280190 A1* | 9/2017 | Oguchi | .............. | H04N 21/4316 |
| 2018/0336415 A1* | 11/2018 | Anorga | ................ | G06N 3/0454 |
| 2019/0082229 A1* | 3/2019 | Grumer | ................ | H04N 21/454 |
| 2019/0147369 A1* | 5/2019 | Gupta | ..................... | G06N 3/126 706/12 |
| 2019/0207672 A1* | 7/2019 | Arora | ................. | H04B 7/18584 |

* cited by examiner

*Primary Examiner* — Haoshian Shih
(74) *Attorney, Agent, or Firm* — Kilpatrick Townsend & Stockton LLP

(57) ABSTRACT

Embodiments disclosed herein relate generally to a customized or personalized GUL. More specifically, embodiments described herein disclose systems and process for deriving user preferences based upon previous actions of a set of users and using those user preferences to personalize one or more widgets within a GUL.

20 Claims, 8 Drawing Sheets

PERSONALIZED GRAPHICAL USER INTERFACE DISPLAYS

BACKGROUND

Many processes attempt to customize data content based on user preferences. For example, location data may be utilized within a web browser to present a user with customized content based the user's location. However, such a customization may be too generic to a select group of users. For example, every user logging in from Mexico may be presented with content in Spanish. In such an example, not every user logging in from Mexico may want to be presented with content in Spanish. Thus, there is a need to present a customized graphical user interface (GUI) that is personalized for a particular subset of individuals.

BRIEF SUMMARY OF THE INVENTION

Techniques disclosed herein described systems, non-transitory computer-readable mediums, and methods for customizing a GUI comprising initiating the GUI for a first user device of a set of user devices, wherein each user of the set of user devices shares at least one common user characteristic. Techniques may further include determining, a first set of widgets, wherein each of the first set of widgets is associated with a first functionality. Techniques may further include causing the first set of widgets to be displayed within the GUI. Techniques may further include receiving, from the first user device, selection data associated with the displayed first set of widgets. Techniques may further include generating, based at least in part on the selection data, an input-output pair. Techniques may further include training, based on the input-output pair, a supervised machine learning model.

In one embodiment, techniques may further include receiving a request from a second user device of the set of user devices, the request comprising at least one user characteristic. Techniques may further include determining, based on the supervised machine learning model and the at least one user characteristic, a first probability score associated with a first widget of the first set of widgets. Techniques may further include causing, based at least in part on the first probability score, the first widget to be displayed within the GUI.

In one embodiment, the request further comprises at least one device characteristic associated with the second user device of the set of user devices. In one embodiment, the techniques further include determining, based on the device characteristic, the first set of widgets. In one embodiment, the at least one common user characteristic comprises an age range.

In one embodiment, techniques may further include generating a plurality of input-output pairs, wherein each input-output pair of the plurality of input-output pairs is associated with a different user device of the set of user devices. In one embodiments techniques may further include training, based on the plurality of input-output pairs, the supervised machine learning model. In one embodiment, the first functionality is receiving a birthdate.

BRIEF DESCRIPTION OF THE DRAWINGS

Features, embodiments, and advantages of the present disclosure are better understood when the following Detailed Description is read with reference to the accompanying drawings.

DETAILED DESCRIPTION OF THE INVENTION

Figure 1:
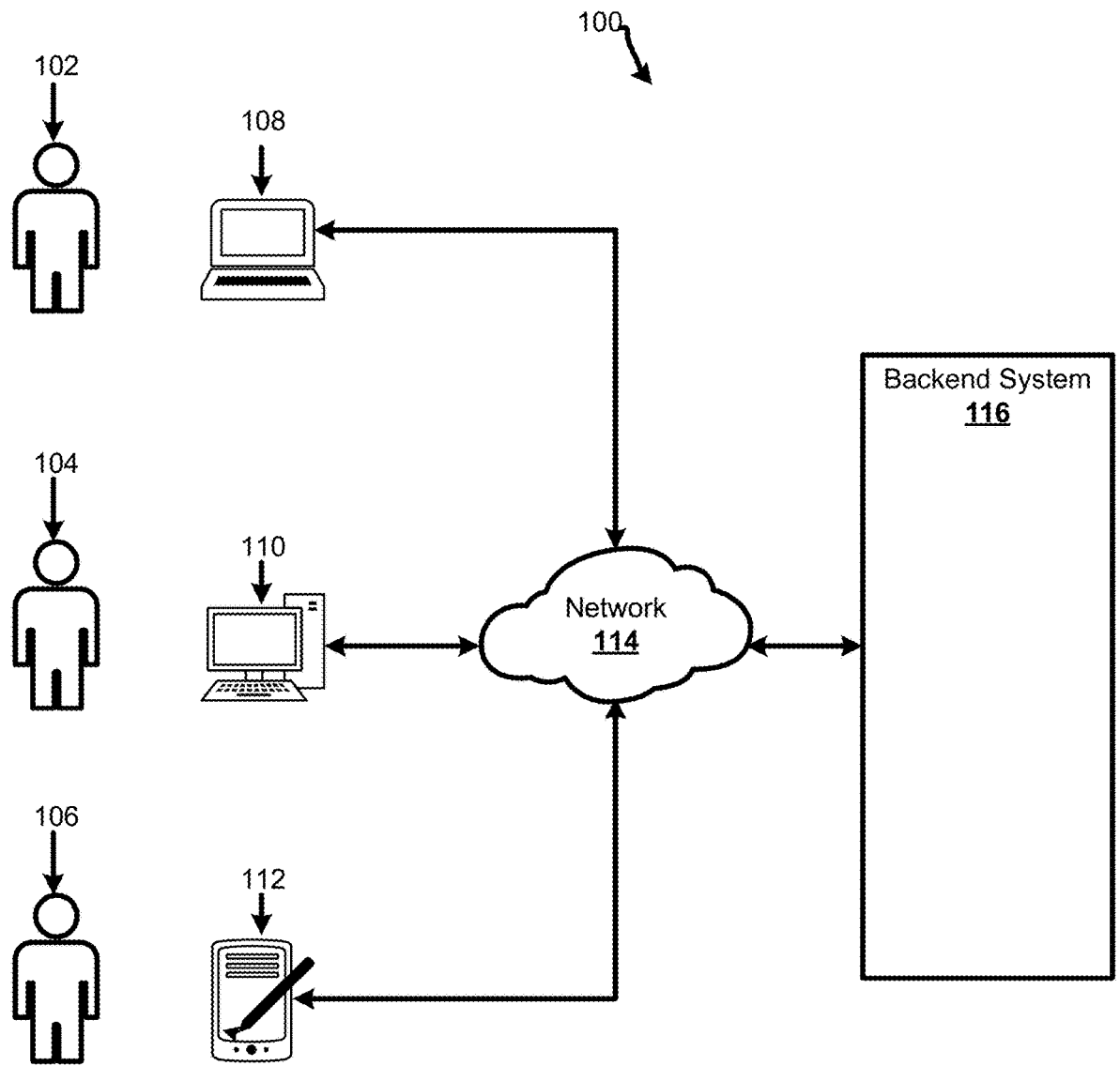
FIG. 1 illustrates an example system in accordance with one or more embodiments herein.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration". Any embodiment or design described herein as "exemplary" is not necessarily to be construed as preferred or advantageous over other embodiments or designs.

Embodiments disclosed herein relate generally to a customized or personalized GUI. More specifically, embodiments described herein disclose systems and process for deriving user preferences based upon previous actions of a set of users and using those user preferences to personalize one or more widgets within a GUI. A GUI may be initiated and displayed to a first set of users. The GUI may be associated with a computer-based application such as a web browser. The first set of users may be selected such that a plurality of the first set of users share similar or same user characteristics. In one embodiment, users within the first set of users may be within a particular age range, location proximity, device type, past user preferences, device resolution, biographic information and the like. For example, the first set of users may be between the ages of 18 and 21. In another example, the first set of users may be Android device users that are single. In another example, the first set of users may have devices with displays above a certain pixel threshold. In one embodiment, a user may knowingly provide certain biographic information such as, but not limited to, race, gender, income range, occupation segment, marital status, and the like. In such an embodiment, the first of users may be users with a similar marital status.

A backend system may determine a first set of widgets to display to the first set of users via the GUI. Each widget in the first set of widgets may be associated with a particular functionality. A widget may be a GUI component. For example, the first set of widgets may be widgets for entering in a birthdate, entering biographical information, entering a security question response, selecting a payment method, displaying information in response to a selection within the GUI, and the like. A widget may be a GUI component that enables a user to interact with one or more parts of an application. A widget may dictate content placement within a GUI, a size of a button within a GUI, navigation structure within a GUI as it relates to a website or application, and the like. Each widget in the first set widgets may take a different form. For example, when the particular functionality of a set of widgets is entering a birthdate, a first widget may enable a user, via a user device, to enter a birthday via a date picker; a second widget may enable a user, via a user device, to enter a birthday via drop down boxes for a month, day and year; a third widget may enable a user, via a user device, to enter a birthday via a free text field. Although each of the widgets of the first set of widgets may ultimately receive the same information, one or more widgets may present different ways to receive the same information. In one embodiment, a user is presented with a plurality of widgets of the first set of widgets.

Once one or more widgets of the first set of widgets are displayed, via one or more GUIs to the first set of users, a backend system may receive selection data associated with the first set of widgets. The selection data may indicate a preference between displayed widgets. For example, a user device may display three different widgets for receiving a birthdate. Selection data may indicate which of the three different widgets the user would prefer to use in the future. In one embodiment, selection data may also indicate which of the three different widgets the user would not like to use in the future.

The backend system may determine, based on the received selection data, an input-output pair for at least one widget in the first set of widgets. The input of the input-output pair may be the common user characteristic(s) of the first set of users and the output may be a binary value associated with a widget. For example, the input may be "users: between 18 and 21" and the output may be "widget A:1, widget B:0, widget C:0." In such an example, a particular user of the first set of users indicated that he preferred widget A to widget B and widget C. The value of 1 indicates a binary yes, while the binary value of 0 indicates a binary non. Input-output pairs may be determined for multiple users of the first set of users. The input-output pairs may be input into a supervised machine learning model. The supervised machine learning model may then derive a function that may take a new set of user credentials and assign a probability score to one or more potential widgets that can be displayed to a user associated with the new set of user credentials.

When a user initializes a GUI, one or more widgets may be customized based on the function derived from the machine learning model. For example, if a user is between the ages of 19-21—and is using an Android device (i.e., a device utilizing an Android operating system), the function produced by the machine learning model may assign a probability score of 50% to widget 1, 30% to widget 2, and 20% to widget 3. Thus, the backend system may return widget 1 to a GUI being displayed on a user device associated with the user. In such an example, widget 1 be a vertical scroll wheel or icon that allows content to be navigated in a scrollable fashion. The machine learning model derives a function for determining the probability that a particular user, based on their user characteristics, will prefer one or more widgets to display content within a GUI.

In response to presenting a particular widget to a user, the backend system may receive input data. The input data may be data received based on a user's interaction with the GUI and one or more widgets within the GUI. For example, input data may indicate a user did not select the displayed particular widget, but instead closed the page, which may indicate the user did not prefer the displayed particular widget. In another example, the input data may indicate a user selected a "do not like" icon or button associated with the displayed particular widget indicating the user does not prefer that displayed particular widget. In another example, the input data may indicate multiple selections of the displayed particular widget, which may indicate that the user is frustrated by the particular widget and does not prefer it. In another example, the input data may indicate a drag operation associated with the displayed particular widget, which may indicate the user is attempting to change the positioning of the widget within the GUI and does not prefer the particular widget.

Regardless of the input data received, the input data will be utilized by the machine learning model to update its function for deriving probability scores. For example, the machine learning model may receive an input-output pair with the input being user characteristics associated with the user and the output being a binary yes or no indicating if the user liked or did not like a particular widget. Input-output pairs based on input data may help keep the function derived by the machine learning model current as often preferences of people can change as time progresses. Other data may be utilized to train the machine learning model such as click-through data. For example, an advertisement may be displayed within the GUI by a particular widget. In such an example, click-through data may indicate if a user selected the ad that was displayed by the widget. An input for an input-output pair may be a user characteristic of a user or a device characteristic of the user device (e.g., operating system of the user device) used to display the GUI. The output for the input-output pair may be a binary value associated with a widget indicating if the advertisement was selected via the widget or not. Such information may be helpful to use by a machine learning model to derive a function that assigns a probability that a particular user, given the user's user characteristics, will prefer (and ultimately select) an advertisement or content displayed via a particular widget.

Techniques described herein are an improvement to GUI technology. A library of widgets (i.e., GUI components) may be stored by a backend system. It is often difficult to determine which widget a particular user would prefer. By utilizing a machine learning model, the backend system may determine, with a certain probability, which widgets of the library of widgets should be used to display particular information. Such customization may create a more enjoyable user experience for a user based on tendencies of similarly situated users (e.g., users with at least some similar user characteristics). Furthermore, the customization may increase the usability of a GUI making it more user friendly for particular segments of users. For example, a machine learning model may determine a function that indicates that a user that is located in country A, and is using a high definition (HD) display (e.g., a display capable of displaying 720p resolution or higher) may have a 60% probability of selecting a news article displayed by widget 1 (e.g., an overlay window with a black trim), a 30% probability of selecting a news article displayed by widget 2 (e.g., an overlay window with a yellow trim), and a 10% probability of selecting a news article displayed by widget 3 (e.g., an overlay window with a red trim). By displaying the news article via widget 1, the user may be more likely to interact with and/or read the news article which increases to usability of the GUI. Furthermore, techniques disclosed herein allow the creation of personalized content without the need of additional coding. A widget library may be located in cloud-based storage and may store a variety of widgets. One or more widgets may be retrieved from this widget library based on techniques disclosed herein. For example, the widget library may be synced to an application and a machine learning model will assign probability scores to widgets within the widget library upon usage of the application and corresponding widgets. Such a technique may significantly reduce the coding development/iteration and analysis times to customize application and user interfaces. Other advantages may be recognized beyond the ones that are explicitly stated herein.

FIG. 1 illustrates system 100 in accordance with one or more embodiments described herein. System 100 comprises users 102-106, devices 108-112, network 114, and backend system 116. Users 102-106 may operate devices 108-112, respectively. In one embodiment, users 102-106 may share one or more similar user characteristics. For example, users 102-106 may be within the same age range, income range, same occupation type, and the like.

Devices 108-112 may display one or more GUIs associated with one or more applications. For example, devices 108-112 may display a GUI of cloud application executing on backend system 116. In such an example, the displayed GUI may display one or more widgets. Devices 108-112 may be different devices. As depicted in FIG. 1, device 108 is a laptop computer, device 110 is a desktop computer, and device 112 is a mobile phone/tablet. Each of devices 108-112 may have different corresponding device characteristics. Device characteristics (i.e. device information) may modify the displayed GUI. For example, the GUI displayed for a first application by device 108 may be a desktop version and the GUI displayed for the first application by device 112 may be a mobile version.

Devices 108-112 may communicate with backend system 116 via network 114. Network 114 may comprise one or more wired or wireless connections to facilitate the transfer of data between devices 108-112 and backend system 116. The wired or wireless connections may be implemented by any type of network familiar to those skilled in the art that can support data communications using any of a variety of commercially-available protocols, including without limitation TCP/IP (transmission control protocol/Internet protocol), SNA (systems network architecture), IPX (Internet packet exchange), and the like. For example, devices 108-112 may be connected to backend system 116 via a local area network (LAN), a wide-area network, the Internet, a wireless network (e.g. a network operating under any of the Institute of Electrical and Electronics (IEEE) 802.11 suite of protocols, Bluetooth, and/or any other wireless protocol), cellular broadband connections (e.g., 4G, 5G, WiMax), and/or any combination of these.

Backend system 116 may provide one or more applications, GUIs, and widgets to devices 108-112. In one embodiment, backend system 116 may be implemented as an application server. Backend system 116 may comprise one or more processors and one or more sets of memory. The one or more sets of memory may store instructions, that when executed by the one or more processors cause backend system 116 to perform one or more functions described herein.

Figure 2:
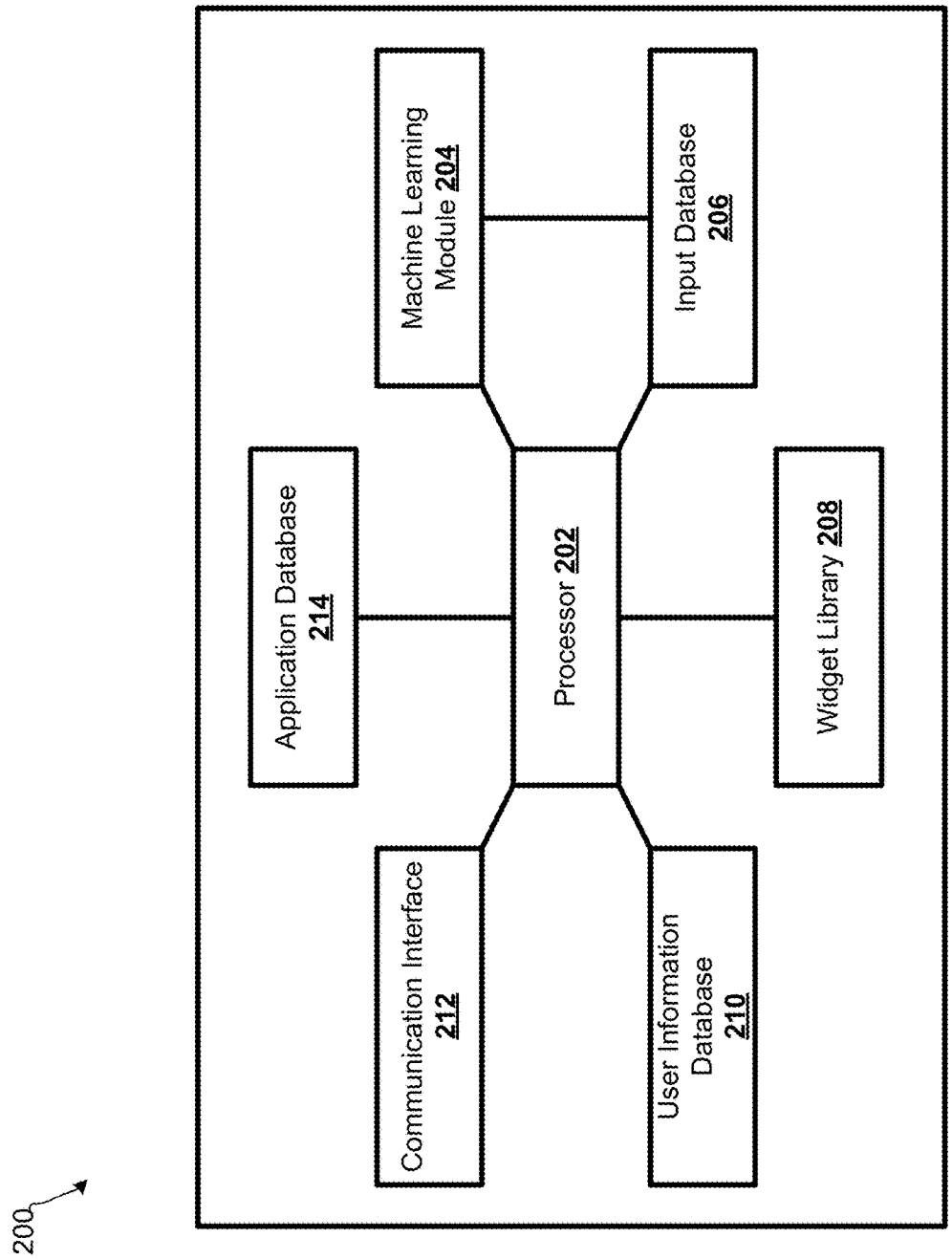
FIG. 2 depicts an example backend system in accordance with one or more embodiments described herein.

FIG. 2 depicts an example backend system 200 in accordance with one or more embodiments described herein. Backend system 200 comprises processor 202, machine learning module 204, input database 206, widget library 208, user information database 210, communication interface 212, application database 214. Processor 202 may include one or more processing units and one or more sets of memory. The one or more processing units can be implemented as one or more integrated circuits, such as single-core or multicore processors. In one embodiment, the processing unit(s) may also be implemented as a quad-core processing unit formed by integrating two dual-core processors into a single chip. In various embodiments, the processing unit(s) can execute a variety of programs in response to program code and can maintain multiple concurrently executing programs or processes. Through suitable programming, the processing unit(s) can provide various functionalities described within this disclosure.

The memory implemented by processor 202 may be volatile (such as random access memory (RAM)) and/or non-volatile (such as read-only memory (ROM), flash memory, etc.). The RAM may contain data and/or program modules that are immediately accessible to and/or presently being operated and executed by the processing unit. In some implementations, the memory may include multiple different types of memory, such as static random access memory (SRAM) or dynamic random access memory (DRAM). The memory may also be a tangible computer-readable storage medium for storing the basic programming and data constructs that provide the functionality of some embodiments described by this disclosure. Software (programs, code modules, instructions) that when executed by the processing unit provide the functionality described by this disclosure.

Machine learning module 204 may store data associated with one or more machine learning algorithms that may be utilized by processor 202. For example, a machine learning algorithm may be a supervised machine learning algorithm such as a linear regression algorithm, a random forest algorithm, and/or a support vector machines algorithm. The machine learning algorithm may take as input, data from input/output database 206 and derive a function. The function may be then utilized by processor 202 to determine a probability score for one or more widgets in widget library 208 based on a set of received user characteristics.

Input database 206 may comprise of non-volatile memory that stores information that is input into one or more machine learning algorithms. Input database 206 may comprise a mapping between one or more user characteristics and one or more widgets. For example, table 1 below shows a sample entry in input database 206.

TABLE 1

| User Characteristic | Widget Identifier | Widget Percentage |
|---|---|---|
| Age: 17-21 | Widget A | 30% |
| Age: 17-21 | Widget B | 60% |
| Age: 17-21 | Widget C | 10% |

Table 1 indicates that for the user characteristic of age between 17-21 30% of such users preferred widget A, 60% preferred widget B, and 10% preferred widget C. Such data may be gathered from user's selection data when given the option of which one of widgets A-C they prefer. Because an input and output is known, the information may be input into supervised machine learning algorithm in order to derive a function that may be capable of predicting what type of a widget a certain user may prefer based on past user selections. Table 1 shows a simplified dataset capable of being stored within input database 206. For example, a user characteristic may include one or more of: an age range location, home location, business location, other biographic information, and the like. In such an example, user characteristics are recorded for a user along with the user's preferred widget and this input-output result may be used to train a supervised machine learning algorithm.

Widget library 208 may comprise of non-volatile memory that stores one or more widgets capable of being displayed via a GUI. Each widget may be a mechanism that is used to display content. For example, a widget may be a drop-down menu, an icon, a radio button, a window of a certain size and/or color, a vertically scrollable window, a horizontally scrollable window, an expandable window, a collapsible window, pagination, breadcrumbs, progress bar, icon, checkbox, size of a button, list box, a dialog box and the like. A widget from widget library 208 may be selected to display within a GUI based on user characteristics associated with a particular user.

User information database 210 may comprise of non-volatile memory that stores user characteristics. Information within user information database 210 may be utilized by processor 202 to identify one or more sets of ranges or groups of user characteristics. For example, user characteristics may include age information of one or more users. Processor 202 may parse age information and then generate one or more age ranges, such as 17-21, 22-32, and the like. In another example, processor 202 may parse location information stored in user information database 210 to generate one or more locations, such as specific states (e.g., California, Iowa, etc.), broader regions (e.g., West Coast, East Coast), various countries (e.g., England, United States, Mexico). These various ranges may be utilized in order to group or identify similar users for purposes of determining related groups of user characteristics.

Communication interface 212 may be hardware that enables backend system 200 to communicate via one or more communication protocols. For example, communication interface 212 may be implemented as a system on a chip (SoC) that enables backend system 200 to send and receive data over a cellular broadband connection or other type of connection such as a WAN or PAN.

Application database 214 may comprise of non-volatile memory that stores one or more applications. The one or more applications may be cloud-based applications that are capable of being initiated by remote user devices. For example, a cloud-based application may be a web-browser, a payment application, a game, a webpage, and the like. Each application has a specific GUI for presenting content of the application. Within each specific GUI one or more widgets may be utilized to display content. The widgets used to display information may be determine based on a requesting user's user characteristics. By using different widgets to display different information to different users, a customized GUI is achieved for a same application being utilized by two different users. In one embodiment, application database 214 may provide applications that are executable by remote user devices. In such an embodiment, a user device may request an application from application database 214 and backend system 200 may customize, based upon a function derived from machine learning module 204, the requested application by including one or more particular widgets to be displayed within the application. Backend system 200 may then send the customized application to the user device.

Figure 3:
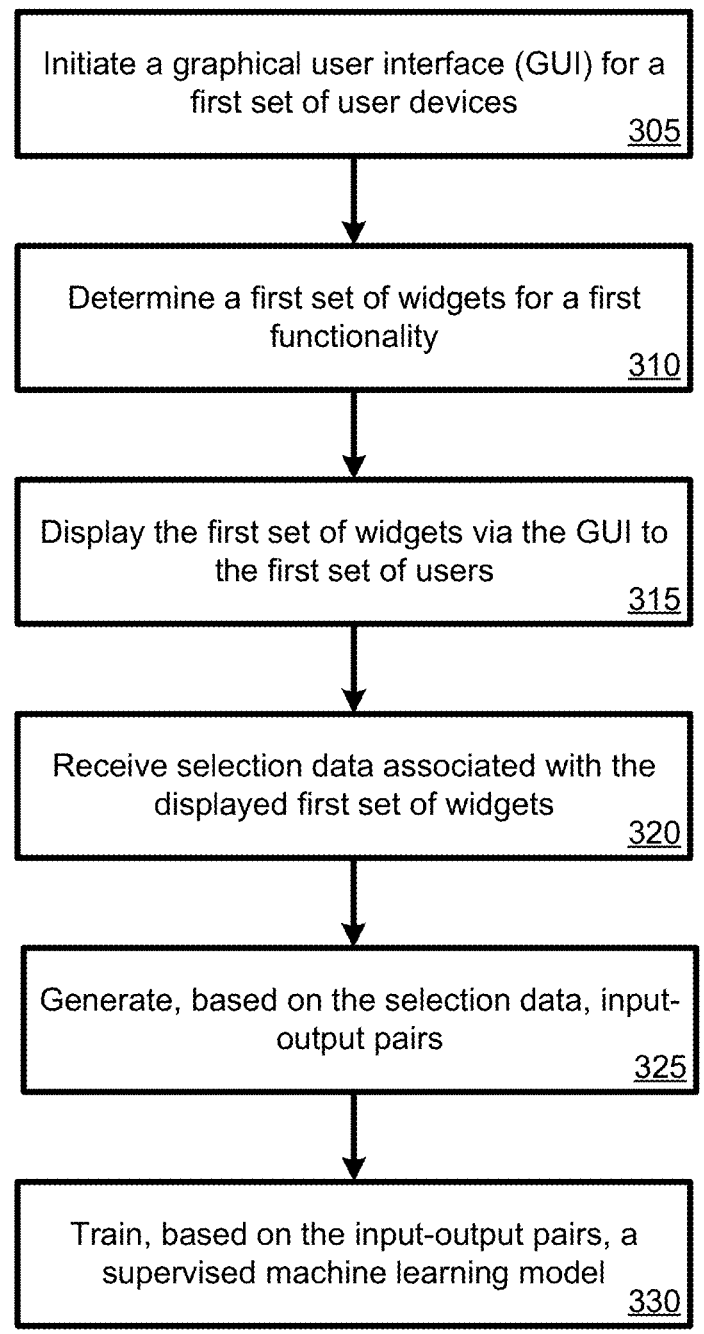
FIG. 3 illustrates an example process in accordance with one or more embodiments described herein.

FIG. 3 illustrates process 300 in accordance with one or more embodiments described herein. One or more operations of process 300 may be performed by one or more parts of system 100 as depicted in FIG. 1. For example, backend system 116 and/or device 110 may perform one or more operations associated with process 300. Process 300 may be a process for training a machine learning model to produce probability scores associated with one or more widgets.

At 305, a backend system may initiate a GUI for a first set of user devices. The backend system may initiate the GUI in response to an application request. For example, the backend system may receive a request from the first set of user devices to execute a cloud-based application and in response the backend system may initiate a GUI for each of the first set of user devices. The GUI may be a GUI for displaying one or more components of an application. For example, the GUI may be a GUI displaying contents of a video game, a news article, web browser, a photo editing application, and the like. The first set of user devices may be a set of user devices that are operated by a first set of users that share at least one commonality (i.e. at least one common user characteristic). For example, the first set of user devices may be a set of user devices that are operated by users that are between the ages of 55 and 65. In another example, the first set of user devices may be a set of user devices that are operated by users that are all male and workout more than twice per week. The fact that the first set of users share at least one commonality means that one or more differences between the first set of users may also exist. For example, the first set of users may include user A that is located in country A and is between the ages of 55 and 65, and user B is located in country B and between the ages of 55 and 65. Both user A and B share the commonality of being between the ages of 55 and 65, but also share the difference of location. By having the first set of users have at least one commonality the data received from the first set of user devices may be associated with the at least one characteristic.

At 310, the backend system determines a first set of widgets for a first functionality to display within the GUI. Each GUI may contain one or more widgets. Each widget may be associated with a functionality. For example, a functionality may be entering information (e.g., a birthdate, credit card info), selecting information (e.g., selecting a payment), modifying information (e.g., editing previously entered data, editing displayed data, expanding data fields, collapsing data fields), and the like. The first set of widgets may be universally selected for each GUI displayed on the first set of user devices. For example, the first set of widgets may be a one or more widgets for entering a birthday.

At 315, the first set of widgets are displayed via the GUI to the first set of user devices. In one example, the first set of widgets may comprise 3 different widgets. An example of these three different widgets is illustrated in FIG. 4.

Figure 4:
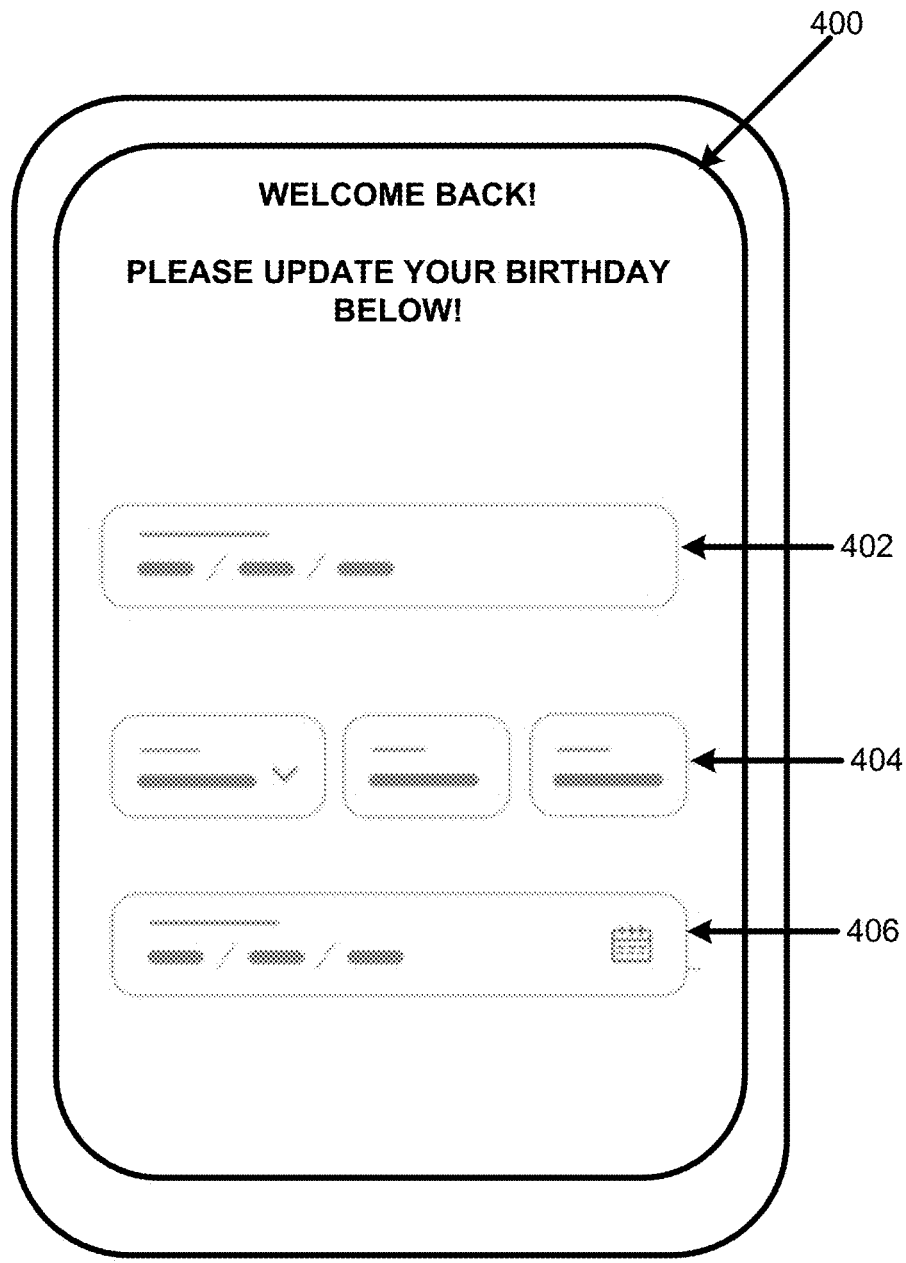
FIG. 4 illustrates an example GUI in accordance with one or more embodiments described herein.

Now with reference to FIG. 4, FIG. 4 illustrates GUI 400 that may be displayed by a first set of user devices. GUI 400 comprises widget 402, widget 404, and widget 406. Each of widgets 402-406 is a widget for entering a birthdate. Widget 402 is a free text field to enter a birthday in the form of MM/DD/YYYY. Widget 404 is a drop-down menu to select a day, month and year. Widget 406 is a date picker using a calendar feature. Upon selection, widget 406 may display a monthly calendar from which a date may be selected. Each of widgets 402-406 are utilized for a same function (i.e., receive a birthdate). As depicted in FIG. 4, a user device may display all of widgets 402-406 within GUI 400. A user device may detect, via a user interaction with GUI 400, a selection of a particular widget. For example, a user interaction may indicate a user has selected widget 402, which may indicate that the particular user prefers widget 402 over widgets 404-406. In one embodiment, there may be a radio button associated with each of widgets 402-406 and a user interaction may indicate a selection of a radio button. In one embodiment, a fourth widget may be displayed requesting a ranking of each of widgets 402-406.

It should be noted that, at 315, the first set of widgets displayed to the first set of user devices may be displayed in different order for one or more of the first of user devices. For example, for a first user, widget 402 may be displayed first, widget 404 may be displayed second, and widget 406 may be displayed third. In one embodiment, for a second user, widget 404 may be displayed first, widget 402 may be displayed second, and widget 406 may be displayed third. In one embodiment, for a third user, widgets 402-406 may all be displayed simultaneously. By randomizing the displaying of widgets to different users, a more accurate assessment of widget preferences may be determined.

Now with reference back to FIG. 3, once a user interaction has been received by a user device indicating a preference of a particular user, the backend system, at 320, receives from each of the first set of user devices, selection data associated with the displayed first set of widgets. The selection data may comprise an indication of which of the displayed widgets a user selected (or prefers). In one embodiment, selection data may comprise an indication of which of the displayed widgets a user least favored. For example, the selection data may indicate that a user did not select a first widget, but removed a second widget from the GUI. The selection data may also indicate a time frame associated with each selection. For example, the selection data may indicate a first user selected a first widget within 10 seconds, a second user selected the second widget within 30 seconds, and a third user selected the third widget after 1 minute. Time frame indication (i.e. time frame data) may indicate how strong of a preference there is for a particular widget. For example, if a particular widget is selected quickly, it may indicate that particular users strongly favor this type of widget. In one embodiment, if a selection data indicates a selection after a certain time frame, then such a selection may not be counted as a preference. For example, if selection data indicates a user selected, via a user interaction, widget C after 30 seconds, the backend system may determine that the particular user does not prefer widget C (e.g., widget C may receive a binary value of 0 for that particular user).

At 325, the backend system generates input-output pairs for a supervised machine learning model based on the received selection data. An input of the input-output pair may include the commonalities between the first set of users (i.e., common user characteristics). An output of the input-output pair may include a widget based on received selection data. For example, selection data from user A may indicate that user A selected widget 1, selection data from user B may indicate that user B selected widget 2, and selection data from user C may indicate that user C selected widget 1. Each of users A-C may have a common user characteristic of being male. For user A, a corresponding input-output pair may comprise input of male and an output of widget 1:1; widget 2:0; widget 3:0 (i.e., binary value of 1 for widget 1, binary value of 0 for widget 2, and binary value of 0 for widget 3). For user B, a corresponding input-output pair may comprise input of male and an output of widget 1:0, widget 2:1, widget 3:0. For user C, a corresponding input-output pair may comprise input of male and an output of widget 1:1, widget 2:0, widget 3:0. These input-output pairs may be utilized to train a supervised machine learning model such that the supervised machine learning model produces a function based on the input-output pairs. In one embodiment, the input in the input-output pair may include multiple user characteristics. For example, the first set of users may share multiple commonalities (i.e., multiple user characteristics). In such an example, the input in an input-output pair may be the shared user characteristics. In one embodiment, the output in the input-output pair may include a ranking of widgets. For example, the users in the first set of users may rank the displayed widgets. In such an example, the output in the input-output pair may include a weight associated with a plurality of widgets.

At 330, a supervised machine learning model is trained based on the generated input/output pairs. The supervised machine learning model may be based on a support vector machine algorithm, linear regression algorithm, logistic regression algorithm, naïve Bayes algorithm, linear discriminant analysis algorithm, decision trees algorithm, k-nearest neighbor algorithm, neural network, and/or a similarity learning algorithm. The supervised machine learning model may receive input-output pairs and derive a function which may be utilized to determine, for a received set of user characteristics, one or more widgets to display based on the received input-output pairs.

Figure 5:
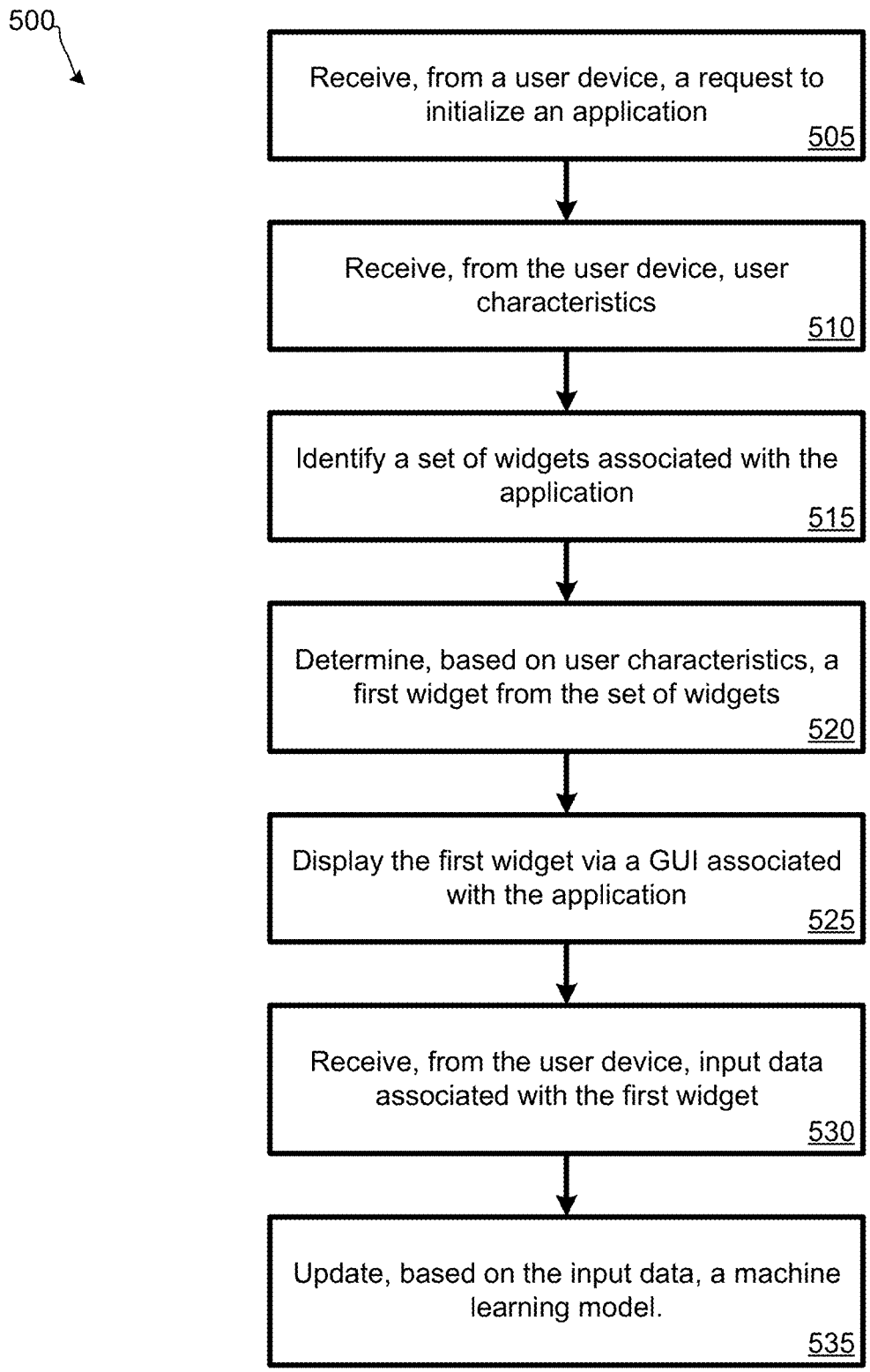
FIG. 5 illustrates an example process in accordance with one or more embodiments described herein.

FIG. 5 illustrates process 500 in accordance with one or more embodiments described herein. One or more operations of process 500 may be performed by one or more parts of system 100 as depicted in FIG. 1. For example, backend system 116 and/or device 110 may perform one or more operations associated with process 500. Process 500 may be a process for updating a machine learning model based on input data received from a user device.

At 505, a backend system receives, from a user device, a request to initiate an application. The application may be an application stored in or serviced by the backend system. For example, the application may be a cloud-based application that is executed and run by the backend system. In another example, the application may be stored locally on the user device and upon initialization retrieves one or more datasets from backend system (e.g., one or more widgets). In such an example, the application may be a web browser that retrieves data to display one or more webpages or web applications from the backend system. In response to receiving the request, the backend system may determine a GUI associated with the application as well as one or more widgets associated with the application for displaying information within the GUI. In one embodiment, the one or more widgets may be stored in a widget library associated with the application.

At 510, the backend system receives, from the user device, user characteristics associated with a user. The user characteristics may be associated with a user operating the user device. The user characteristics may include one or more attributes of the user. For example, user characteristics may include a particular age range, location proximity, and the like. In one embodiment, in addition to user characteristics, the backend system may receive, from the user device, device characteristics associated with the user device. Device characteristics may include, an operating system identifier, a device identifier, and uplink and downlink bandwidth, storage capacity of the device, available connection types (i.e., 4G, 5G, Wi-Fi, and the like), and other device information. In one embodiment, device characteristics may limit which widgets may be retrieved by the backend system. For example, particular widgets may be compatible with certain devices. In such an example, widget A may be compatible with an Android operating system and widget B may be compatible with an iOS operating system. Thus, if device characteristics indicate a user device is running an Android operating system, then widget B may be omitted from being identified by the backend system.

At 515, the backend system identifies a set of widgets associated with the application. The set of widgets may be widgets that may be utilized display one or more contents of application within a GUI. The set of widgets may be particular to the application. In one embodiment, a plurality of applications may share one or more widgets. The backend system may identify a particular set of widgets based on device characteristics received at 510. For example, a group of widgets may be associated with a mobile device while another group of widgets, within the same set of widgets, may be associated with a desktop device. In one embodiment, when the received request to initialize an application includes device characteristics indicating the requesting user device is a desktop device, then the widgets associated with the desktop device may be identified.

At 520, the backend system determines, based on one or more user characteristics, a first widget from the set of widgets to display within the GUI associated with the application. The backend system may determine, via a machine learning produced algorithm or function, a probability score associated with one or more identified widgets. An input into the machine learning produced algorithm may be one or more user characteristics associated with a user of the user device. The output of the algorithm may be a probability score (e.g., probability percentage) indicating a likelihood that a user, based on the received user characteristic(s) will prefer a particular widget. For example, received user characteristics may indicate a user is male and is between ages 17 and 21. These user characteristics are input into a machine learning model derived function. An output of the function may be different scores associated with different widgets. For example, widget A may have a 50% probability score, widget B may have a 30% probability score, and widget C may have a 20% probability score. These probability scores indicate the likelihood that, based upon the requesting user being a male between the ages of 17 and 21, the user will likely prefer widget A. As a result of widget A having the highest probability score, it is selected to display within a GUI, for the requesting user. For example, a pop-up window used to display a hint in a video game may be displayed by widget A (e.g., a pop up window with Times New Roman front) as opposed to widget B (e.g., collapsible window with Arial font). The machine learning model derived function may receive any number of user characteristics as an input and return probability scores for a plurality of widgets based on one or more of the received user characteristics. In one embodiment, probability scores may only be generated for identified widgets. These identified widgets, as described at 515 may be based on an application and device characteristics.

At 525, the backend system displays the first widget via the GUI associated with the application. The first widget may be the widget from a set of widgets that has the highest probability score according to a machine learning model derived function. The widget may be pushed to the user device to display on a screen attached to or integrated with the user device. Examples of displayed widgets are shown in FIGS. 6-8.

Figure 6:
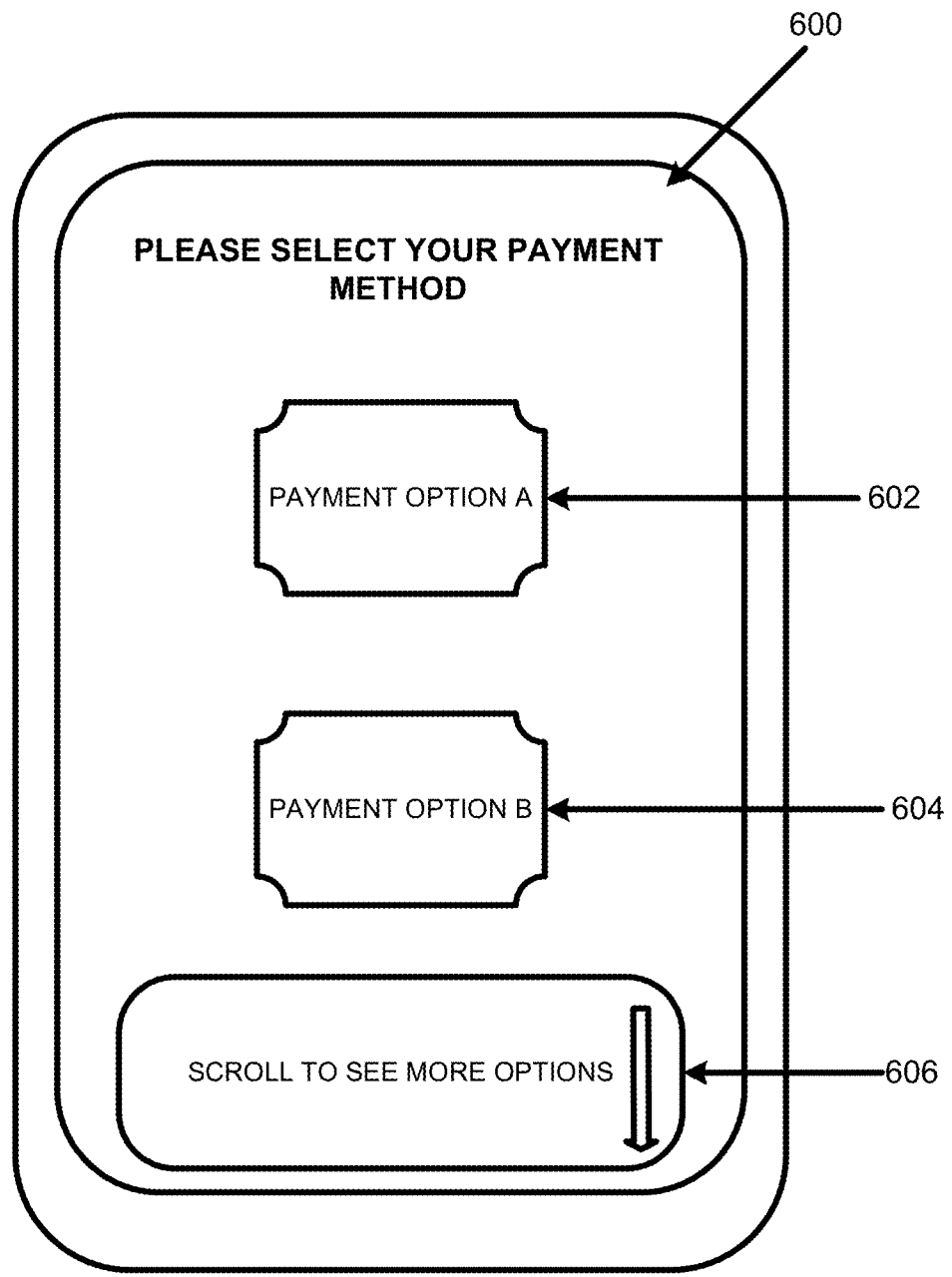
FIG. 6 illustrates an example GUI in accordance with one or more embodiments described herein.

Now with reference to FIG. 6, FIG. 6 illustrates GUI 600 that may be displayed to a user device. GUI 600 comprises widget 602, widget 604, and widget 606. Widgets 602-604 may be widgets for displaying a payment option. Widget 606 may be a widget for scrolling to more payment options. Widget 606 may receive a vertical scroll input (e.g., a vertical finger swipe) and in response, present one or more additional widgets for displaying different payment options. In one embodiment, one or more widgets 602-606 may be determined by a machine learning model derived function. For example, widgets 602-604 may be default widgets, and widget 606 may be determined by the machine learning model derived function. In such an example, widgets 602-604 may be displayed to user devices regardless of user characteristics associated with the user devices. Widget 606 may have the highest probability among a set of widgets based on received user characteristics.

Figure 7:
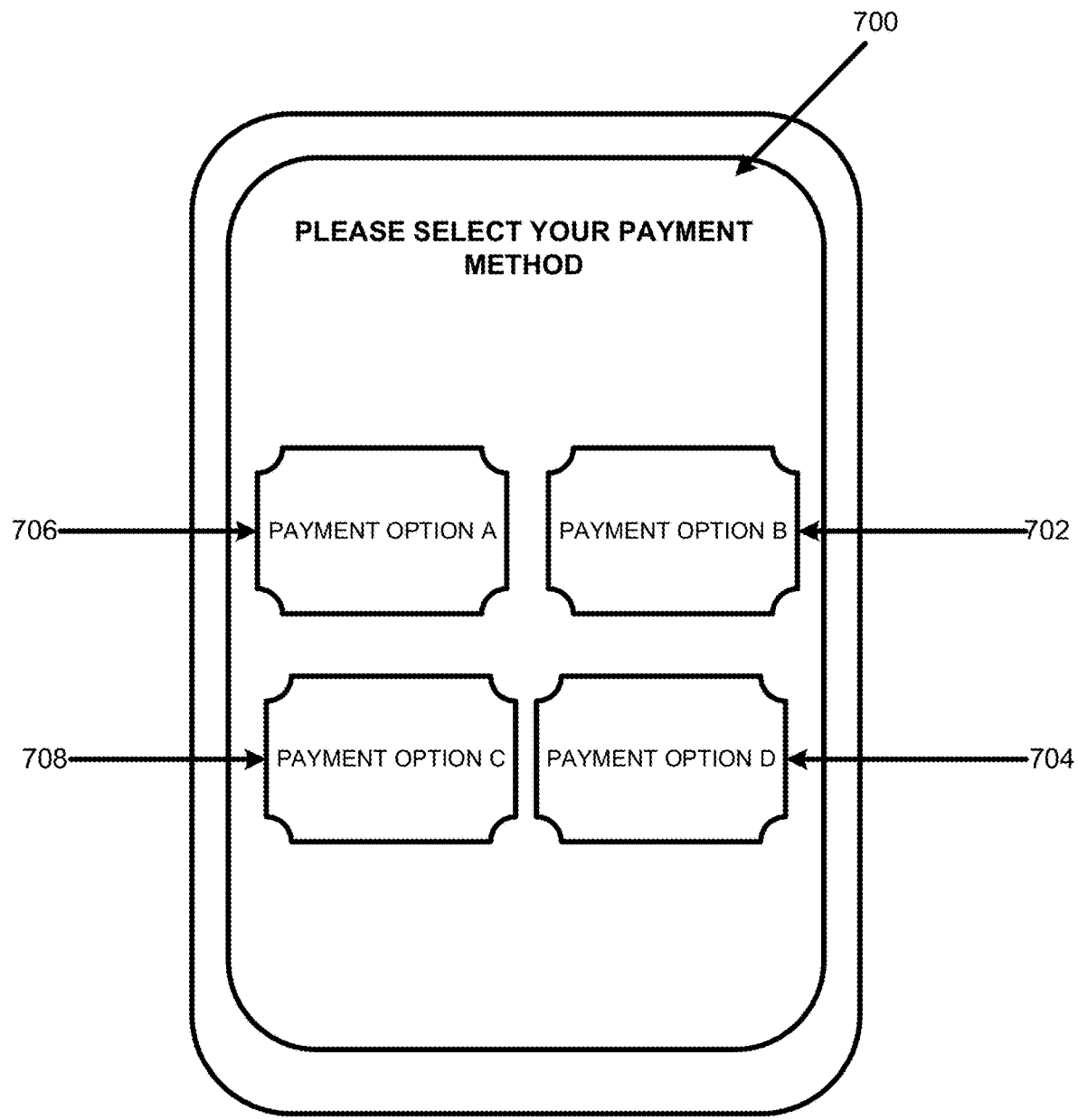
FIG. 7 illustrates an example GUI in accordance with one or more embodiments described herein.

Now with reference to FIG. 7, FIG. 7 illustrates GUI 700 that may be displayed to a user device. GUI 700 comprises widgets 702-708. Each of widgets 702-708 may be a widget for displaying different payment options. In one embodiment, widgets 702-708 may be default widgets, but the arrangement of widgets 702-708 may be determined by a machine learning model derived function. For example, the organization of one or more widgets may itself be a particular widget. As shown in FIG. 7, a widget may indicate that widgets 702-708 are displayed in a box-shape format. Similar to other widgets, a widget that determines the arrangement of other widgets may be determined based by the machine learning model derived function based on received user characteristics. The widget that determines the arrangement of other widgets may have the highest probability among a set of arrangement widgets based on received user characteristics.

Figure 8:
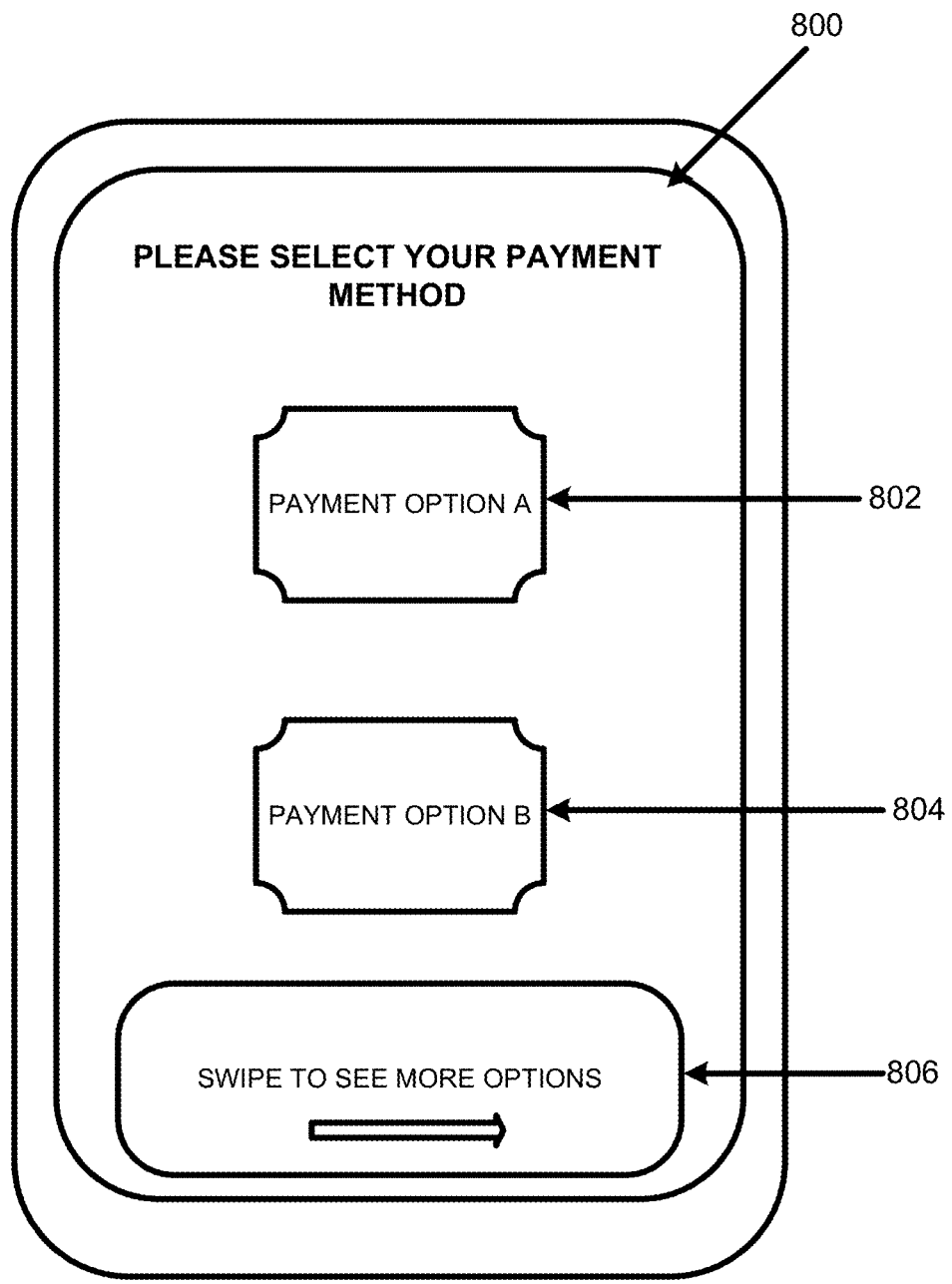
FIG. 8 illustrates an example GUI in accordance with one or more embodiments described herein.

Now with reference to FIG. 8, FIG. 8 illustrates GUI 800 that may be displayed to a user device. GUI 800 comprises widget 802, widget 804, and widget 806. Widgets 802-804 may be widgets for displaying a payment option. Widget 806 may be a widget for scrolling to more payment options. Widget 806 may receive a horizontal scroll input (e.g., a horizontal finger swipe) and in response, present one or more additional widgets for displaying different payment options. In one embodiment, one or more widgets 802-806 may be determined by a machine learning model derived function. For example, widgets 802-804 may be default widgets and widget 806 may be determined by the machine learning model derived function. Widget 806 may have the highest probability among a set of widgets based on received user characteristics. Each of GUIs 600-800 displays similar information, but each of GUIs 600-800 display information (via one or more widgets) in a customized manner depending upon received user characteristics.

Now with returned reference to FIG. 5, at 530, the backend system receives, from the user device, input data associated with the first widget. The input data may indicate if a user prefers the first widget. For example, with brief reference to FIG. 6, widget 606 may indicate that one or more additional payment options may be presented with a vertical swipe. In such an example, a user may select a radio button or other instrument (e.g., an icon, text box, and the like) associated with widget 606 to indicate that widget 606 is not preferred. This indication data may be input data, as it indicates the input of a particular user. The input data may then be transmitted from the user device to the backend system. In another example, with brief reference to FIG. 7, input data may indicate that a user does not like the way widgets 702-708 are arranged. In such an example, the user device may receive an input indicating a vertical or horizontal swipe which indicates a user wants to scroll through one or more widgets. In response to receiving the swipe data in response to being presented widgets 702-708, the user device may generate input data indicating that a particular user does not prefer the arrangement as displayed in GUI 700. In another example, with brief reference to FIG. 8, input data may indicate that a user does prefer widget 806. Input data may indicate that within a certain time period (e.g. 10 seconds) the user activated widget 806 by the user device receiving a horizontal swipe. Utilizing widget 806 within a certain time period (i.e. time frame) may indicate that a particular user prefers widget 806 or at least the particular user does not mind widget 806. In response, the user device may generate input data indicating that a particular user does prefer widget 806.

Regardless of the input data received by the backend system, at 535, the backend system, based on the received input data, updates the machine learning model. Because user preferences may change over time, current data may be utilized to modify the machine learning model derived function. The input data may be new input-output data for training the machine learning model. For example, an input may be user characteristics associated with a particular user and the output may be a binary result on if a displayed widget was preferred or not. By continuously updating input-output data based on received input data, the machine learning model may continuously adjust to the changing preferences of particular user groups.

It is within the scope of embodiments described herein to utilize a machine learning model derived function to assign a probability score to one or more new widgets based at least on widget characteristics. A widget characteristic may define or detail one or more properties of a widget, for example, a vertical scroll functionality (e.g., item 606 of FIG. 6), a horizontal scroll functionality (e.g., item 806 of FIG. 8), a square display (e.g., item 604 of FIG. 6), a unique display (e.g., item 702 of FIG. 7), a radio button selection tool, a text field entry field (e.g., item 402 of FIG. 4), a drop down menu selection tool (e.g., item 404 of FIG. 4), a calendar selection tool (e.g., item 406 of FIG. 4), and the like. An input-output pair may comprise of an input of user characteristics and an output of one or more widget characteristics. For example, an input in an input-output pair may be the age range of 17-21, and an output may be a radio button selection tool. In such an example, this input-output pair may indicate a user interaction has indicated that a particular user, that is in between the ages of 17-21, prefers a widget that comprises of a radio button selection tool. Such a widget may be a widget for receiving various forms of information, such as a birthdate, a yes/no selection, and the like. This input-output pair may be fed into a machine learning model and a machine learning model derived function may be produced. The machine learning model derived function may receive user characteristics of a user and assign a probability score to a particular widget characteristic. Then a widget with that particular widget characteristic may be returned to the user. Such a technique may allow new widgets to be suggested to users based on user characteristics and widget characteristics.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

The invention claimed is:

1. A method for customizing a graphical user interface (GUI) comprising:
    initiating the GUI for a first user device of a set of user devices, wherein each user of the set of user devices shares at least one common user characteristic;
    determining a first set of widgets to facilitate learning a user preference for a type of input control to input a particular type of data with a widget, the first set of widgets comprising a first widget and an alternative widget that are controllable to allow input of user-specified data of the particular type with different input controls of the GUI, the user-specified data being the same whether received via the first widget or via the alternative widget, where:
        the first widget is controllable to allow input of the user-specified data with a first input control of a first type of input control from a set of input control types comprising a text field, a drop-down control, or another type of input control; and
        the alternative widget is controllable to allow input of the user-specified data with a second input control of a second type of input control from the set of input control types, where the second type of input control is different from the first type of input control;
    causing the first widget and the alternative widget to be displayed simultaneously within the GUI to allow input of the user-specified data with the first input control of the first type of input control and the second input control of the second type of input control to specify the same user-specified data via the first widget and via the alternative widget;
    receiving, from the first user device, selection data associated with the displayed first set of widgets, where the selection data corresponds to input of the user-specified data via the first widget or the alternative widget;
    generating, based at least in part on the selection data, an input-output pair, wherein:

an input corresponding to the input-output pair is based at least in part on the at least one common user characteristic, and the at least one common user characteristic comprises a device type of the first user device that is identified from a plurality of device types or a location corresponding to the first user device;

an output corresponding to the input-output pair comprises a value associated with the first widget or the alternative widget; and the input-output pair comprises a mapping of the input to the output;

training, based on the input-output pair, a supervised machine learning model; and customizing the GUI or another GUI based on the supervised machine learning model.

2. The method of claim 1, further comprising:
determining, based on the supervised machine learning model and the at least one common user characteristic, a first probability score associated with a first widget of the first set of widgets, wherein the customizing is based at least in part on the first probability score associated with the first widget.

3. The method of claim 2, wherein the customizing comprises configuring the GUI or the other GUI to include the first widget.

4. The method of claim 1, wherein the GUI and the other GUI are customized based on the supervised machine learning model.

5. The method of claim 1, wherein the at least one common user characteristic comprises the device type of the first user device that is identified from the plurality of device types.

6. The method of claim 1, further comprising:
deriving, from the supervised machine learning model, a function for determining a probability that a particular user, based on one or more user characteristics, will prefer one or more widgets to display content;
wherein the customizing comprises customizing a requested application based on the derived function to include a first widget of the first set of widgets.

7. The method of claim 1, wherein the first widget and the alternative widget are controllable to allow input of a birthdate.

8. A non-transitory, computer-readable storage medium having stored thereon instructions that, when executed by one or more processing devices, cause the one or more processing devices to perform operations comprising:
initiating a graphical user interface (GUI) for a first user device of a set of user devices, wherein each user of the set of user devices shares at least one common user characteristic;
determining a first set of widgets to facilitate learning a user preference for a type of input control to input a particular type of data with a widget, the first set of widgets comprising a first widget and an alternative widget that are controllable to allow input of user-specified data of the particular type with different input controls of the GUI, the user-specified data being the same whether received via the first widget or via the alternative widget, where:
the first widget is controllable to allow input of the user-specified data with a first input control of a first type of input control from a set of input control types comprising a text field, a drop-down control, or another type of input control; and
the alternative widget is controllable to allow input of the user-specified data with a second input control of a second type of input control from the set of input control types, where the second type of input control is different from the first type of input control;
causing the first widget and the alternative widget to be displayed simultaneously within the GUI to allow input of the user-specified data with the first input control of the first type of input control and the second input control of the second type of input control to specify the same user-specified data via the first widget and via the alternative widget;
receiving, from the first user device, selection data associated with the displayed first set of widgets, where the selection data corresponds to input of the user-specified data via the first widget or the alternative widget;
generating, based at least in part on the selection data, an input-output pair, wherein;
an input corresponding to the input-output pair is based at least in part on the at least one common user characteristic, and the at least one common user characteristic comprises a device type of the first user device that is identified from a plurality of device types or a location corresponding to the first user device;
an output corresponding to the input-output pair comprises a value associated with the first widget or the alternative widget; and
the input-output pair comprises a mapping of the input to the output;
training, based on the input-output pair, a supervised machine learning model; and
customizing the GUI or another GUI based on the supervised machine learning model.

9. The non-transitory, computer-readable storage medium of claim 8, the operations further comprising:
receiving a request from a second user device of the set of user devices, the request comprising at least one common user characteristic;
determining, based on the supervised machine learning model and the at least one common user characteristic, a first probability score associated with a first widget of the first set of widgets; and
causing, based at least in part on the first probability score, the first widget to be displayed within the GUI.

10. The non-transitory, computer-readable storage medium of claim 9, wherein the request further comprises at least one device characteristic associated with the second user device of the set of user devices.

11. The non-transitory, computer-readable storage medium of claim 10, the operations further comprising:
determining, based on the at least one device characteristic, the first set of widgets.

12. The non-transitory, computer-readable storage medium of claim 8, wherein the at least one common user characteristic comprises at least one of: an age range, an income range, or a gender.

13. The non-transitory, computer-readable storage medium of claim 8, the operations further comprising:
generating a plurality of input-output pairs, wherein each input-output pair of the plurality of input-output pairs is associated with a different user device of the set of user devices; and
training, based on the plurality of input-output pairs, the supervised machine learning model.

14. The non-transitory, computer-readable storage medium of claim 8, wherein the first widget and the alternative widget are controllable to allow input of a birthdate.

15. A system for customizing a graphical user interface (GUI) comprising:
one or more processors; and
a memory coupled with the one or more processors, the memory configured to store instructions that, when executed by the one or more processors, cause the one or more processors to:
initiate the GUI for a first user device of a set of user devices, wherein each user of the set of user devices shares at least one common user characteristic;
determine a first set of widgets to facilitate learning a user preference for a type of input control to input a particular type of data with a widget, the first set of widgets comprising a first widget and an alternative widget that are controllable to allow input of user-specified data of the particular type with different input controls of the GUI, the user-specified data being the same whether received via the first widget or via the alternative widget, where:
the first widget is controllable to allow input of the user-specified data with a first input control of a first type of input control from a set of input control types comprising a text field, a drop-down control, or another type of input control; and
the alternative widget is controllable to allow input of the user-specified data with a second input control of a second type of input control from the set of input control types, where the second type of input control is different from the first type of input control;
cause the first widget and the alternative widget to be displayed simultaneously within the GUI to allow input of the user-specified data with the first input control of the first type of input control and the second input control of the second type of input control to specify the same user-specified data via the first widget and via the alternative widget;
receive, from the first user device, selection data associated with the displayed first set of widgets, where the selection data corresponds to input of the user-specified data via the first widget or the alternative widget;
generate, based at least in part on the selection data, an input-output pair, wherein:
an input corresponding to the input-output pair is based at least in part on the at least one common user characteristic, and the at least one common user characteristic comprises a device type of the first user device that is identified from a plurality of device types or a location corresponding to the first 37 user device;
an output corresponding to the input-output pair comprises a value associated with the first widget or the alternative widget; and
the input-output pair comprises a mapping of the input to the output;
train, based on the input-output pair, a supervised machine learning model; and
customize the GUI or another GUI based on the supervised machine learning model.

16. The system of claim 15, wherein the instructions, when executed by the one or more processors, further cause the one or more processors to:
receive a request from a second user device of the set of user devices, the request comprising at least one user characteristic;
determine, based on the supervised machine learning model and the at least one user characteristic, a first probability score associated with a first widget of the 6 first set of widgets; and
cause, based at least in part on the first probability score, the first widget to be displayed within the GUI.

17. The system of claim 16, wherein the request further comprises at least one device characteristic associated with the second user device of the set of user devices.

18. The system of claim 17, wherein the instructions, when executed by the one or more processors, further cause the one or more processors to:
determine, based on the at least one device characteristic, the first set of widgets.

19. The system of claim 15, wherein the at least one common user characteristic comprises at least one of: an age range, an income range, or a gender.

20. The system of claim 15, wherein the instructions, when executed by the one or more processors, further cause the one or more processors to:
generate a plurality of input-output pairs, wherein each input-output pair of the plurality of input-output pairs is associated with a different user device of the set of user devices; and
train, based on the plurality of input-output pairs, the supervised machine learning model.

* * * * *